United States Patent [19]

Krashkevich

[11] Patent Number: 5,234,871
[45] Date of Patent: Aug. 10, 1993

[54] VANADIUM- AND COPPER-CONTAINING GLASSES FOR USE AS FILTERS FOR LIGHT SOURCES INTENDED FOR USE WITH NIGHT VISION DEVICES

[75] Inventor: David G. Krashkevich, Duryea, Pa.

[73] Assignee: Schott Glass Technologies, Inc., Duryea, Pa.

[21] Appl. No.: 798,092

[22] Filed: Nov. 27, 1991

[51] Int. Cl.$^5$ .................................. C03C 4/10
[52] U.S. Cl. ............................ 501/73; 501/46; 501/904
[58] Field of Search ................ 501/46, 73, 904

[56] References Cited

U.S. PATENT DOCUMENTS 5,036,025 7/1991 Lin .............................. 501/48

Primary Examiner—Karl Group
Assistant Examiner—Chris Gallo
Attorney, Agent, or Firm—Millen, White, Zelano and Branigan

[57] ABSTRACT

The invention relates to a glass consisting essentially of

| | |
|---|---|
| $P_2O_5$ | 43-59 |
| $SiO_2$ | 0-9 |
| $Al_2O_3$ | 7-11 |
| $Li_2O$ | 0-15 |
| $Na_2O$ | 0-15 |
| $K_2O$ | 0-15 |
| $MgO$ | 0-15 |
| $CaO$ | 0-0.5 |
| $BaO$ | 0-7 |
| $ZnO$ | 0-7 |
| $CeO_2$ | 0-0.5 |
| $CuO$ | 7-21 |
| $V_2O_5$ | 0.07-0.7 |
| $Pr_6O_{11}$ | 0-1.5 |
| $Nd_2O_3$ | 0-1.5 |
| $Nb_2O_5$ | 0-3 |
| $B_2O_3$ | 0-3 |
| $Y_2O_3$ | 0-3 |
| $Cr_2O_3$ | 0-1 | having a photopic transmission of at least 10% at full rated voltage and a color space of NVIS Green A or B. The glass is useful in the production of optical filters for use with light sources in order to render said sources compatible with night vision imaging systems.

13 Claims, 7 Drawing Sheets

VANADIUM- AND COPPER-CONTAINING GLASSES FOR USE AS FILTERS FOR LIGHT SOURCES INTENDED FOR USE WITH NIGHT VISION DEVICES

BACKGROUND OF THE INVENTION

Night vision devices are image intensification apparatuses that amplify the night ambient illuminated view by a factor of approximately $10^4$. As used in aircraft, these devices usually take the form of goggles worn by the pilot. Night vision devices usually include a photocathode which converts photons into electrons, a multiplier, and a phosphor screen to convert electrons back into photons. The pilot therefore accordingly views the scene outside the aircraft as a phosphor image displayed in the goggle eyepiece. Cockpit lighting, of instruments, gauges and warning signals, must be "compatible" with the goggles, i.e., must not emit significant amounts of radiant energy in the range detected by the goggle, so as to avoid flaring and "blooming", resulting in erasure of the image, which occurs when a light source is inadequately filtered to remove a sufficient level of interfering radiation. Significant amounts of cockpit radiation in the goggle range can also result in shutdown of the goggle where automatic gain control is used. Therefore, cockpit instrumentation must emit limited amounts of red and very near infra-red (IR) radiation. Blue, blue-green and green glass filters have been used to modify emissions from light sources for this purpose.

The military Joint Logistics Commanders Ad Hoc Group for Aviation Lighting has promulgated specification MIL-L-85762A specifying night vision device-compatible lighting for aircraft interiors. In this standard, four colors have been defined for various cockpit lighting tasks. "NVIS (Night Vision Imaging System) Green A" is for primary, secondary and advisory lighting. Utilizing the 1976 CIE Convention Green A has coordinates of a circle of radius 0.037, with the center at $u'=0.088$, $v'=0.543$. "NVIS Green B" is for special lighting components needing saturated (i.e., more nearly monochromatic) lighting for contrast Green B has a radius of 0.057 with the center at $u'=0.131$, $v'=0.623$. "NVIS Yellow" is used for master caution and warning signals, and has a radius of 0.083 with the center at $u'=0.274$, $v'0.622$. "NVIS red" for warning signals is defined as $u'=0.450$, $v'=0.550$ with a radius at 0.060. These color spaces are set forth in FIG. 7; it is noted that the 1976 CIE convention values of u' and v' may be converted to the 1931 CIE convention values as follows:

$$x = \frac{3v'}{4.5u' - 12v' + 9} \text{ and } y = \frac{6.75u'}{4.5u' - 12v' + 9}$$

Lighting emission in these colors visible to the NVIS is specified by the standard not to exceed certain levels defined for "radiance". NVIS radiance (NR) is the integral of the curve generated by multiplying the spectral radiance of the light source by the relative spectral response of the NVIS:

$$NR = \int_{450}^{930} G_r \cdot S \cdot N \cdot d\lambda$$

where $G_r$ is the relative NVIS response, N is the spectral radiance of the lighted component in $W/cm^2$ Sr nm, S is the ratio of required luminescence level for NVIS radiance defined by luminescence measured by the spectroradiometer, and $d\lambda$ is 5 nm. The military NR standard requires that displays not exceed $1.7 \times 10^{-10}$ when the lighting produces 0.1 fL display luminance. Warning and master caution signals may be brighter, at levels of between $5.0 \times 10$ and $1.5 \times 10^{-7}$ with source luminance levels of up to 15 fL. for Class A Type I goggles.

Significant variations in NVIS radiance and color coordinates are common in filtered incandescent lighted devices. The primary cause is the relationship of these parameters to the spectral energy distribution of the light source(s). The energy distribution of an incandescent lamp is fundamentally related to filament operating temperature. Filament temperature varies strongly with operating voltage, and also varies somewhat from lamp to lamp due to minor differences in filaments.

Filtered light sources which meet the above criteria must also be visible in daylight conditions. Consequently, filters must possess acceptable "photopic transmission", a measure of visual readability of displays in which a light source is filtered for NVIS compatibility. The value of photopic transmission is calculated by an integration from 380 to 780 nm considering eye response, glass transmission, and radiance of the source, divided by eye response times unfiltered source radiance. The integration is usually performed at 5 to 10 nm increments. Typical procedures for the calculation of transmission values are set forth in the Handbook of Colorimetry, Technology Press, MIT, 1936 pp. 33–35.

SUMMARY OF THE INVENTION

The present invention provides glasses for use in the production of filters suitable for compatibility of light sources for use with night vision devices. The glasses have the following composition:

| Oxide | General Mole % Input Range | Preferred Mole % Input Range |
|---|---|---|
| $P_2O_5$ | 43–59 | 47–53 |
| $SiO_2$ | 0–9 | 1–7 |
| $Al_2O_3$ | 7–11 | 8–10 |
| $Li_2O$ | 0–5 | 2–4 |
| $Na_2O$ | 0–15 | 1–7 |
| $K_2O$ | 0–15 | 5–13 |
| MgO | 0–15 | 0–10 |
| CaO | 0–0.5 | 0–0.3 |
| BaO | 0–7 | 0–5 |
| ZnO | 0–7 | 0–5 |
| $CeO_2$ | 0–0.5 | 0.2–0.4 |
| CuO | 7–21 | 9–20 |
| $V_2O_5$ | 0.07–0.7 | 0.15–0.40 |
| $Pr_6O_{11}$ | 0–1.5 | 0–1.0 |
| $Nd_2O_3$ | 0–1.5 | 0–1.0 |

An additionally preferred embodiment is the use of $Li_2O$ in an amount of 0–15 mole %, preferably 2–6 mole %, even more preferably the amount of $Li_2O$ is 0–5 or 5–15 mole %, or 2–4 or 4–6 mole %. Another additionally preferred embodiment is the use of $K_2O$ in an amount of 3–13 mole %, even more preferably 3–5 or 5–13 mole %.

Also preferred are glasses further comprising the following oxides, in addition to those above:

| Oxide | General Mole % Input Range | Preferred Mole % Input Range |
|---|---|---|
| $Nb_2O_5$ | 0–3 | 0–2 |
| $B_2O_3$ | 0–3 | 0–2 |

| Oxide | General Mole % Input Range | Preferred Mole % Input Range |
|---|---|---|
| $Y_2O_3$ | 0–3 | 0–2 |
| $Cr_2O_3$ | 0–1 | 0–0.5 |

Even more preferably, the four oxide components above are present in an amount of at least 0.1 mole %.

Additional preferred range endpoints for copper are 8, 9, 10, 11, 12, 13, 14, 15, 16, 17, 18, 19 and 20. Additional preferred endpoints for vanadium are 0.10, 0.15, 0.20, 0.25, 0.30, 0.35, 0.40, 0.45, 0.50, 0.55, 0.60 and 0.65.

Surprisingly, the glasses of the invention possess excellent photopic transmission, on the order of 10% or greater at full rated voltage (i.e., at a color temperature of 2100–2150K) for Green A, and about 8–10% or greater for Green B, despite the inclusion of vanadium along with copper in the composition. Copper attenuates the near infrared red region by virtue of its broad band infrared absorption, as well as visually coloring the glass blue. The addition of vanadium produces visible region absorptions which bias the chromaticity toward the green and aid in 600–650 nm region attenuation. In combination, one would expect the photopic transmission of the glass to decrease as these elements are combined. However, when vanadium is added in the proportions in accordance with the invention, surprisingly, the photopic transmission is increased. After a maximum desirable value of vanadium ions, the photopic transmission begins to decrease.

As can be seen from page 84 of Colour Generation and Control in Glass by Bamford, vanadium should be an oxidizing agent for copper; therefor, the inclusion of vanadium, in the $V^{+5}$ state, will enhance the concentration of the $Cu^{+2}$ population at the expense of the $V^5$ population. The reaction can be written as follows:

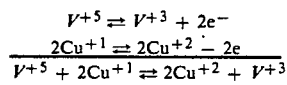

As the population of $V^{+3}$ increases the visual transmission should be impaired due to the position of the optical absorption bands of $V^{+3}$ in the visible part of the electromagnetic spectrum *Optical Absorption of Glasses,* George H. Sigel, tr. What is surprising, when the correct amount of $V_2O_5$ is added to the batch, is that an increase in phototopic (visual) transmittance is observed; as detailed in the Examples.

The actual amount of $V_2O_5$ required to optimize photopic transmission is dependent upon the total copper content and the base glass composition, and can be determined by routine parametric transmission experimentation as per the Example.

The glasses of the invention are prepared by conventional melting techniques and can be molded into any desired shape using conventional glass handling techniques, e.g., into faceplates, windows, lenses, etc. In addition, the glasses of the invention may be repressed into any desired shape or redrawn into tubing for, e.g., fabrication of jackets for incandescent bulbs.

Filters made from the glasses of the invention are effective to produce NVIS Green A or Green B colored light from any source, and are preferably used but are not limited to filter incandescent sources.

Where Green B is desired, the glasses contain praseodymium and chromium in an amount effective to produce that color.

Filters produced from glasses of the invention preferably have thicknesses of 3, 2, 1.5 or 1 mm. The transmission spectrum of the filters varies according to thickness, however, the spectrum may be optimized according to routine parametric transmission experiments varying the filter thickness, such as those in the examples.

DESCRIPTION OF THE DRAWINGS

The data presented in FIG. 1

Figure 1:
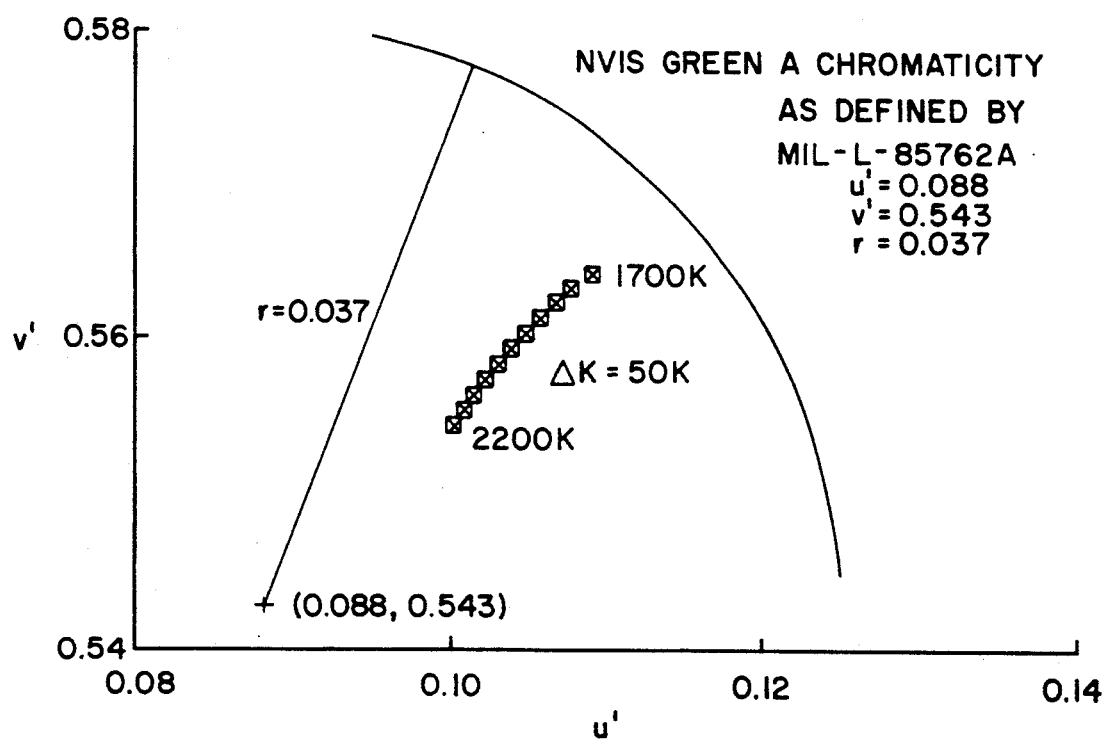
Figure 2:
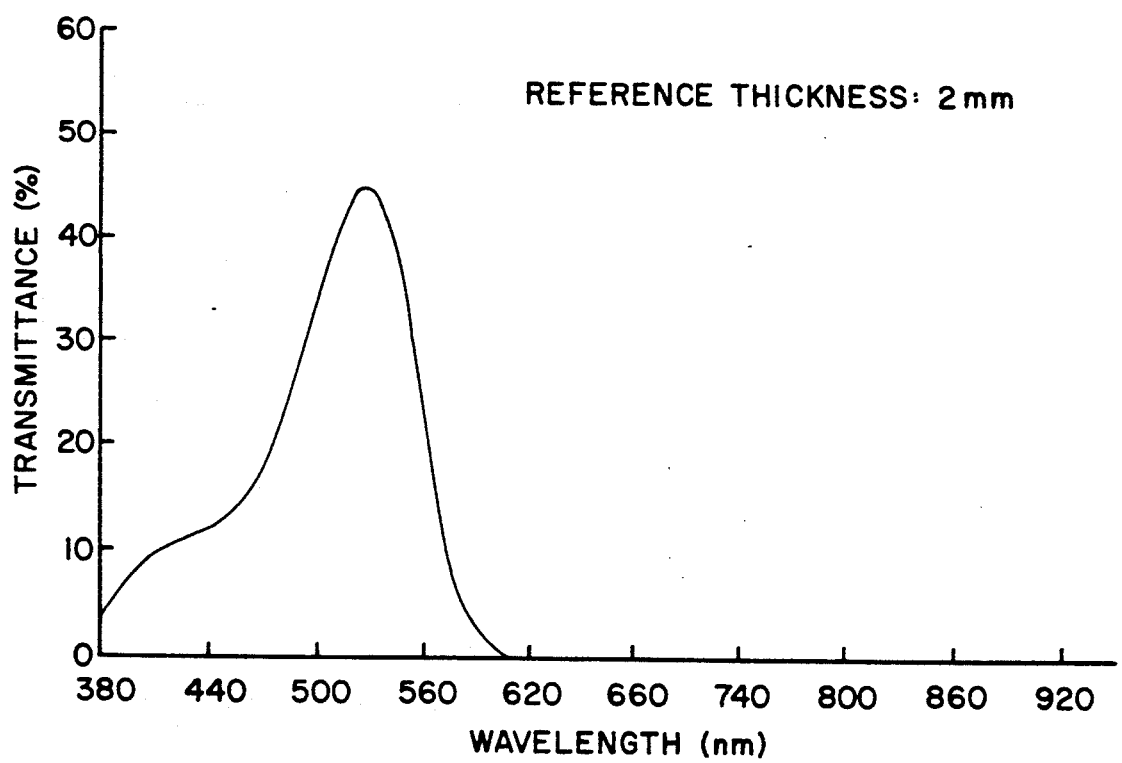
FIGS. 2 and 5 show transmittance of light as a function of wavelength.
Figure 3:
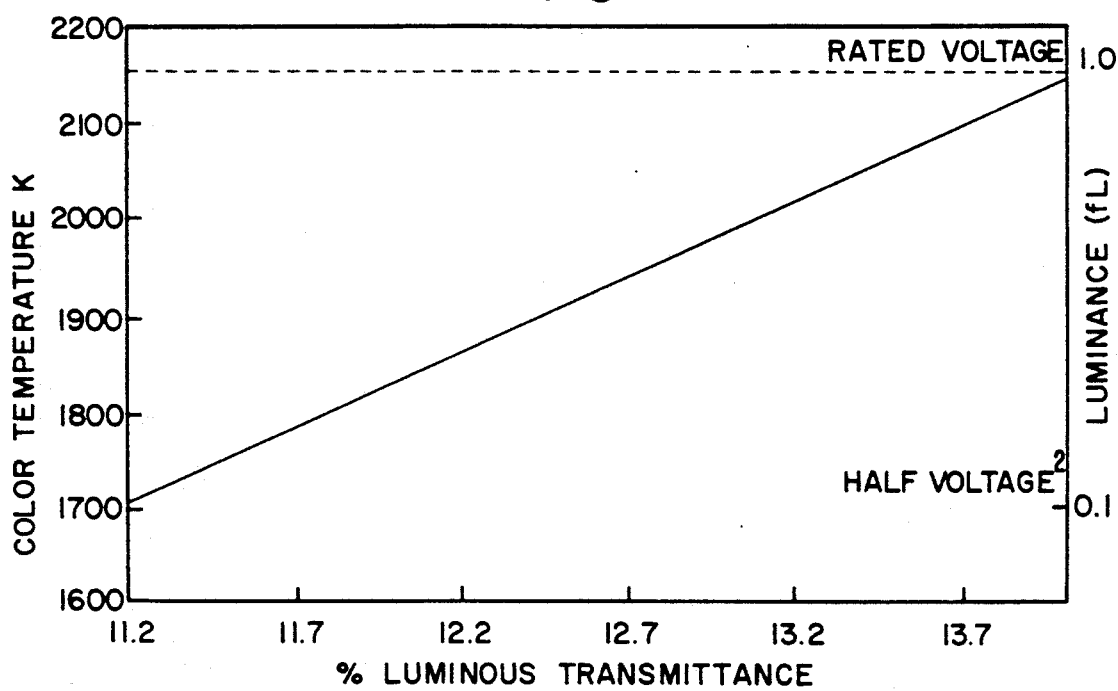
FIGS. 3 and 6 show the photopic transmittance of filters as a function of color temperature.
Figure 4:
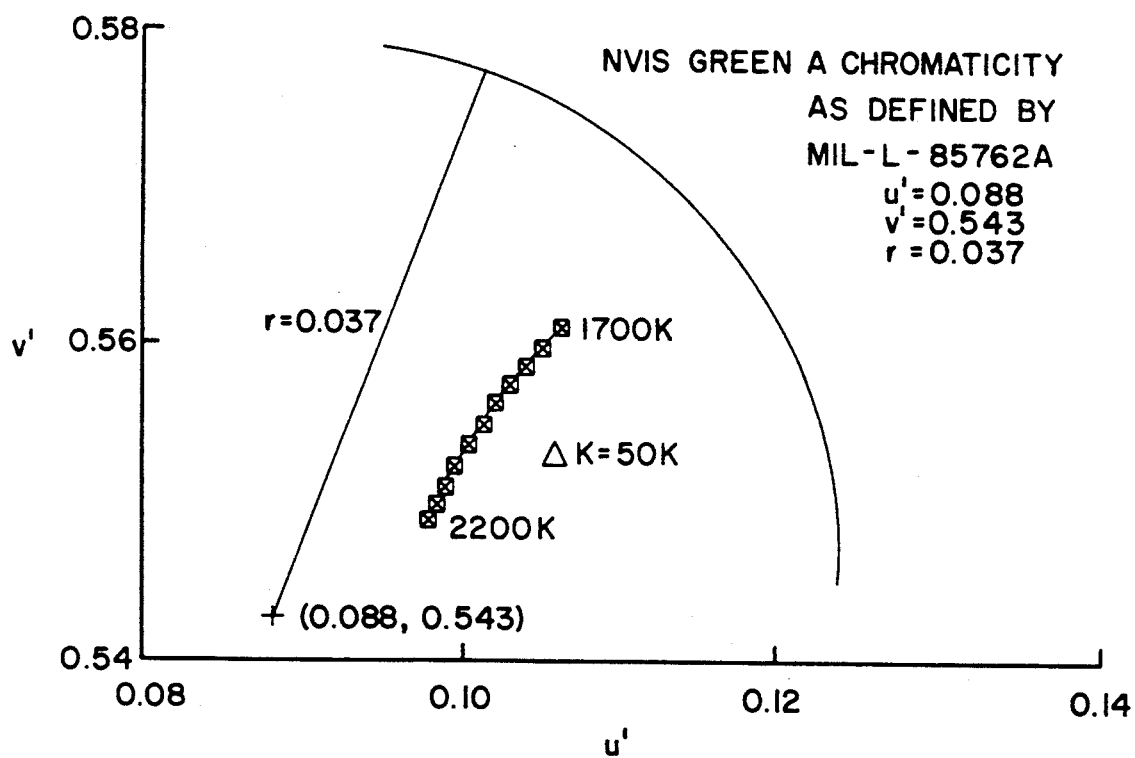
FIG. 4 shows variation in color coordinates and NVIS radiance over the operating range of several types of miniature lamps commonly used by manufacturers of illuminated avionics devices.
Figure 5:
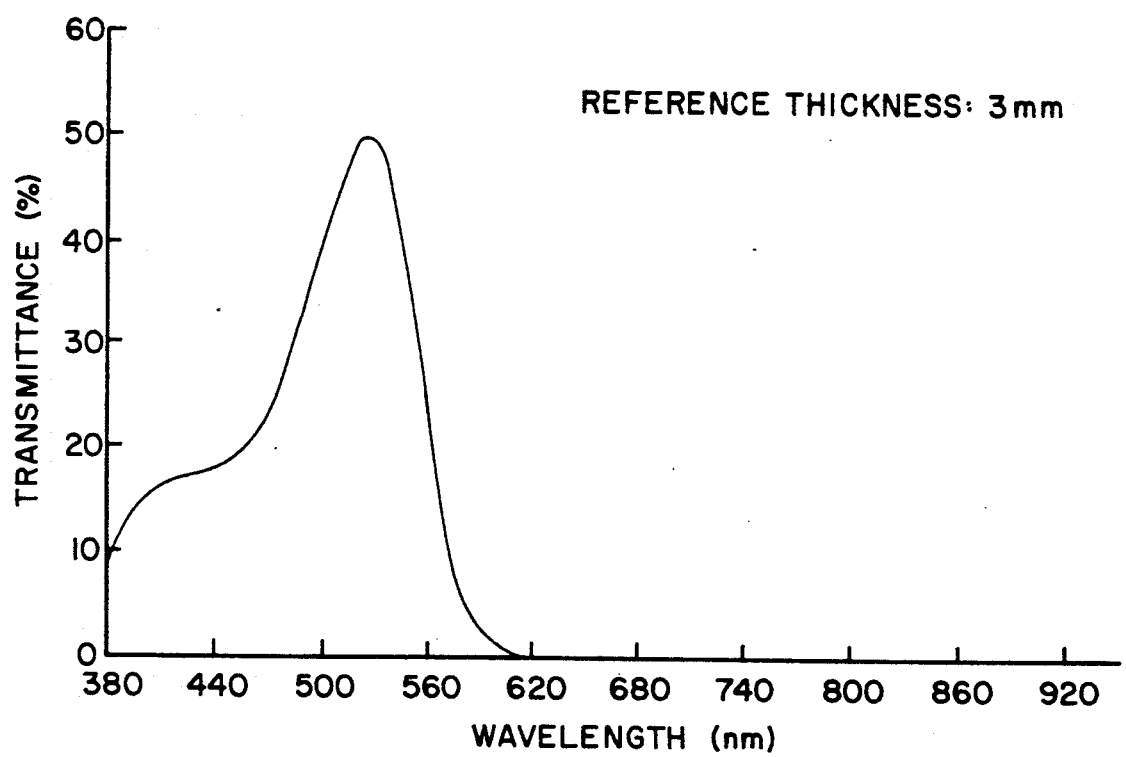
Figure 6:
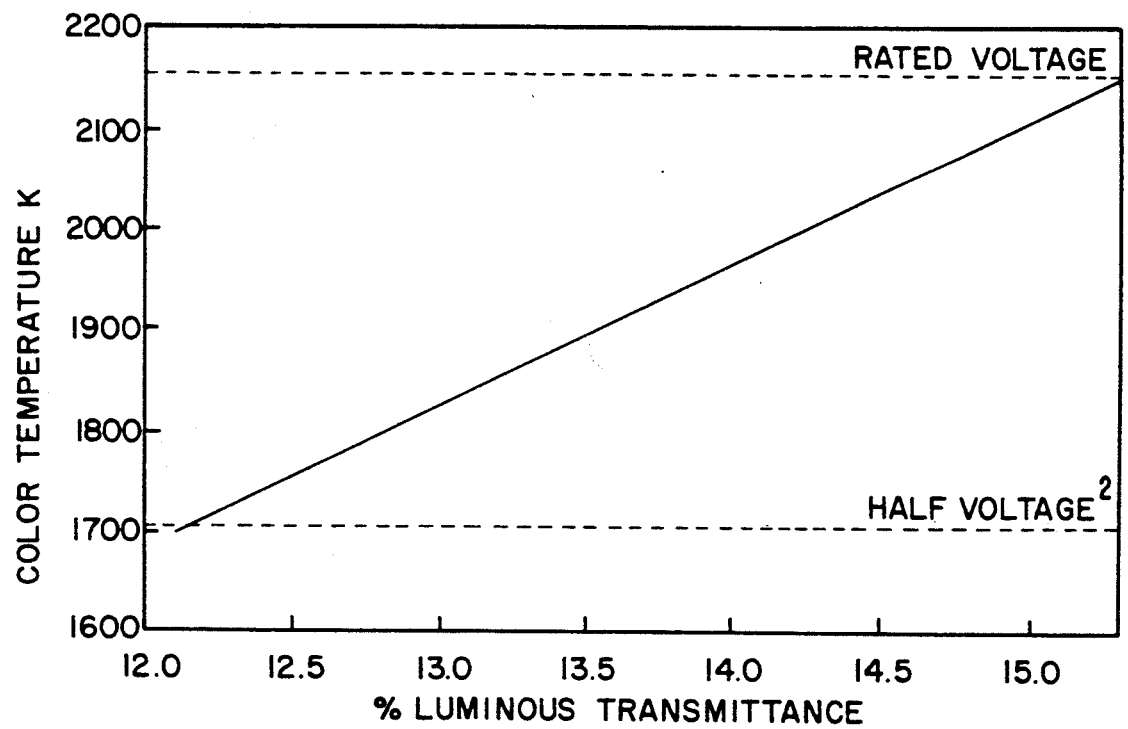
Figure 7:
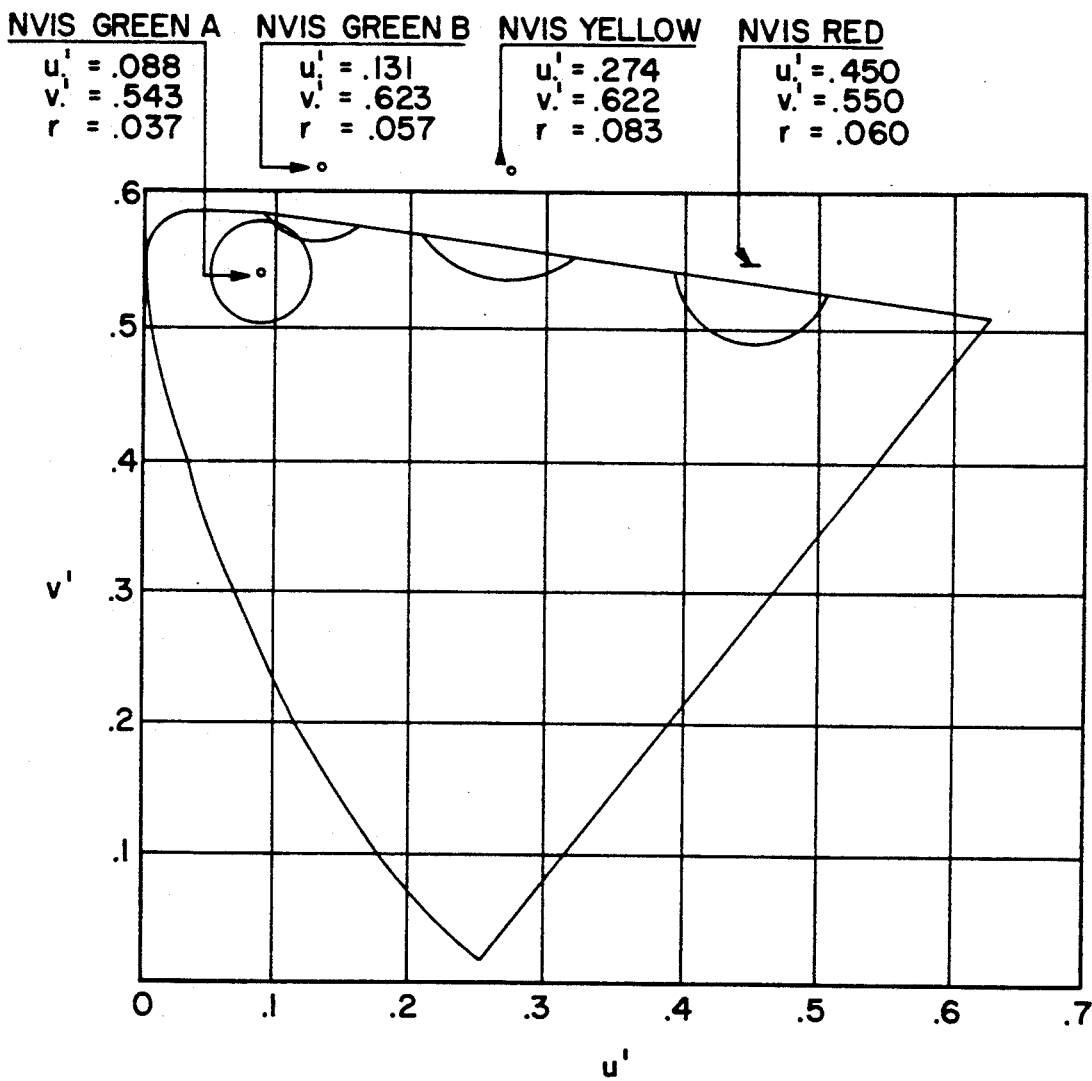
FIG. 7 defines the color space occupied by the glasses of the invention (NVIS Green A and B).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are expressed in mole percent.

The entire disclosures of all applications, patents and publications, cited above and below, are hereby incorporated by reference.

TABLE 1

| | TEST MELT NUMBER | | | | | | |
|---|---|---|---|---|---|---|---|
| | NVGA-12 | NVGA-16 | NVGA-17 | NVGA-18 | NVGA-20 | NVGA-27 | NVGA-28 |
| Application | 3 mm | 3 mm | 3 mm | 3 mm | 3 mm | 3 mm | 3 mm |
| Composition (mole % Input) | | | | | | | |
| $P_2O_5$ | 51.97 | 51.97 | 51.97 | 51.97 | 48.97 | 48.97 | 48.79 |
| $SiO_2$ | 0.92 | 0.92 | 0.92 | 0.92 | 3.92 | 3.92 | 3.92 |
| $Al_2O_3$ | 9.25 | 9.25 | 9.25 | 9.25 | 9.25 | 9.25 | 9.25 |
| $Li_2O$ | 2.77 | 2.77 | 2.77 | 2.77 | 2.77 | 2.77 | 2.77 |
| $Na_2O$ | 12.90 | 12.90 | 12.90 | 12.90 | 6.45 | 6.45 | 6.45 |
| $K_2O$ | — | — | — | — | 6.45 | 6.45 | 6.45 |
| MgO | 9.33 | 9.33 | 9.33 | 9.33 | 9.33 | 9.33 | 9.33 |
| CaO | 0.26 | 0.26 | 0.21 | 0.17 | 0.26 | — | — |
| $CeO_2$ | 0.32 | 0.41 | 0.32 | 0.32 | 0.32 | 0.32 | 0.32 |
| CuO | 12.21 | 12.21 | 12.21 | 12.21 | 12.21 | 12.21 | 12.21 |
| $V_2O_5$ | 0.092 | — | 0.138 | 0.184 | 0.092 | 0.352 | 0.531 |
| Properties | | | | | | | |

TABLE 1-continued

| | TEST MELT NUMBER | | | | | | |
|---|---|---|---|---|---|---|---|
| | NVGA-12 | NVGA-16 | NVGA-17 | NVGA-18 | NVGA-20 | NVGA-27 | NVGA-28 |
| Photopic Transmission for 2100K Incandescent Illuminant Source | 14.6 | 15.0 | 15.6 | 16.5 | 10.9 | 11.6 | 9.9 |
| Chromaticity Coordinates @ 2100K | | | | | | | |
| x | 0.2299 | 0.2291 | 0.2352 | 0.2301 | 0.2193 | 0.2096 | 0.2044 |
| y | 0.5730 | 0.5486 | 0.5801 | 0.5717 | 0.5860 | 0.5931 | 0.6070 |
| Meet Radiance Requirements for Near Infrared Attenuation as per MIL-L-85762A i.e. NR = $\leq 1.7 \times 10^{-10}$ | YES | YES | YES | YES | YES | YES | YES |
| Meet Green A Chromaticity Requirements | YES | YES | YES | YES | YES | YES | YES |

TABLE 2

TEST MELT DATA ON TWO-LITER NVGA-33 GLASS SAMPLE PRODUCTION

| | TEST MELT NUMBER | | | |
|---|---|---|---|---|
| | NVGA-33 2L/1 | NVGA-33 2L/2 | NVGA-33 2L/3 | NVGA-33 2L/4 |
| Filter Application Green A (thickness) | (3 mm) | (3 mm) | (3 mm) | (3 mm) |
| Composition (mole % Input) | | | | |
| $P_2O_5$ | 51.97 | 51.97 | 51.97 | 51.97 |
| $SiO_2$ | 0.92 | 0.92 | 0.92 | 0.92 |
| $Al_2O_3$ | 9.25 | 9.25 | 9.25 | 9.25 |
| $Li_2O$ | 2.77 | 2.77 | 2.77 | 2.77 |
| $Na_2O$ | 6.45 | 6.45 | 6.45 | 6.45 |
| $K_2O$ | 6.45 | 6.45 | 6.45 | 6.45 |
| MgO | 9.33 | 9.33 | 9.33 | 9.33 |
| CaO | 0.17 | 0.17 | 0.17 | 0.17 |
| $CeO_2$ | 0.32 | 0.32 | 0.32 | 0.32 |
| CuO | 12.21 | 12.21 | 12.21 | 12.21 |
| $V_2O_5$ | 0.184 | 0.184 | 0.184 | 0.184 |
| Properties | | | | |
| Photopic Transmission for 2100K Incandescent Illuminant Source | 15.0 | 15.1 | 14.7 | 15.6 |
| Meet Radiance Requirements for Near Infrared Attenuation as per MIL-L-84762A i.e. NR = $\leq 1.7 \times 10^{-10}$ | YES | YES | YES | YES |
| Meet Green A Chromaticity Requirements | YES | YES | YES | YES |

TABLE 3

TEST MELT DATA ON TWO-LITER NVGA-29 GLASS SAMPLE PRODUCTION

| | TEST MELT NUMBER | | | |
|---|---|---|---|---|
| | NVGA-29 2L/1 | NVGA-29 2L/2 | NVGA-29 2L/3 | NVGA-29 2L/4 |
| Filter Application Green A (thickness) | (2 mm) | (2 mm) | (2 mm) | (2 mm) |
| Composition (mole % Input) | | | | |
| $P_2O_5$ | 48.97 | 48.97 | 48.97 | 48.97 |
| $SiO_2$ | 3.92 | 3.92 | 3.92 | 3.92 |
| $Al_2O_3$ | 9.25 | 9.25 | 9.25 | 9.25 |
| $Li_2O$ | 2.77 | 2.77 | 2.77 | 2.77 |
| $Na_2O$ | 3.13 | 3.13 | 3.13 | 3.13 |
| $K_2O$ | 6.45 | 6.45 | 6.45 | 6.45 |
| MgO | 9.33 | 9.33 | 9.33 | 9.33 |
| CaO | — | — | — | — |
| $CeO_2$ | 0.32 | 0.32 | 0.32 | 0.32 |
| CuO | 15.53 | 15.53 | 15.53 | 15.53 |
| $V_2O_5$ | 0.352 | 0.352 | 0.352 | 0.352 |
| Properties | | | | |
| Photopic Transmission for 2100K Incandescent Illuminant Source | 13.5 | 13.7 | 13.9 | 13.8 |
| Meet Radiance Requirements for Near Infrared Attenuation as per MIL-L-84762A i.e. NR = $\leq 1.7 \times 10^{-10}$ | YES | YES | YES | YES |
| Meet Green A Chromaticity Requirements | YES | YES | YES | YES |

TABLE 4

TEST MELT DATA ON TWO-LITER NVGA GLASS

| | TEST MELT NUMBER | | |
|---|---|---|---|
| | NVGA-54 2L/1 | NVGA-58 2L/1 | NVGA-59 2L/1 |
| Filter Application Green A (thickness) | (2 mm) | (2 mm) | (2 mm) |
| Composition (mole % Input) | | | |
| $P_2O_5$ | 48.97 | 48.97 | 48.97 |
| $SiO_2$ | 3.92 | 3.92 | 3.92 |
| $Al_2O_3$ | 8.25 | 8.25 | 8.25 |
| $Li_2O$ | 2.77 | 2.77 | 2.77 |
| $Na_2O$ | 3.13 | 3.13 | 3.13 |
| $K_2O$ | 6.45 | 6.45 | 6.45 |
| MgO | 9.33 | 9.33 | 9.33 |
| CaO | — | — | — |
| $CeO_2$ | 0.32 | 0.32 | 0.32 |
| CuO | 15.53 | 15.53 | 15.53 |
| $V_2O_5$ | 0.352 | 0.352 | 0.352 |
| $Nb_2O_5$ | 1.00 | — | — |
| $Y_2O_5$ | — | 1.00 | — |
| $B_2O_3$ | — | — | 1.00 |
| Properties | | | |
| Photopic Transmission for 2100K Incandescent Illuminant Source | 13.8 | 13.4 | 15.1 |
| Meet Radiance Requirements for Near Infrared Attenuation as per MIL-L-84762A i.e. NR = $\leq 1.7 \times 10^{-10}$ | YES | YES | YES |
| Meet Green A Chromaticity Requirements | YES | YES | YES |

EXAMPLE A

A 2 mm filter is produced from a glass in accordance with the preceding examples, and determined to have the following characteristics:

| Refractive Index, $n_d$ | 1.547 ± 0.005 |
|---|---|
| Density (g/cm$^3$) | 2.77 |
| Thermal Expansion Coefficient | |
| −50–100° × 10$^{7}$° C.$^{-1}$ | 76 |
| 20–200° × 10$^{7}$° C.$^{-1}$ | 89 |
| Softening Pt. −10$^{7.6}$ (°C.) | 543 |
| Annealing Pt. −10$^{13}$ (°C.) | 453 |
| Passed thermal shock test as per MIL-STD-202F Method 107F Condition B | |
| Passed Humidity test as per MIL-STD-202 Method 107 Condition A | |

EXAMPLE B

A 3 mm filter is produced from a glass in accordance with the preceding examples, and determined to have the following characteristics;

| Refractive Index, $n_d$ | 1.543 ± 0.005 |
|---|---|
| Density (g/cm$^3$) | 2.75 |
| Thermal Expansion Coefficient | |
| −50–100° × 10$^{7}$° C.$^{-1}$ | 97 |
| 20–200° × 10$^{7}$° C.$^{-1}$ | 97 |
| Softening Pt. −10$^{7.6}$ (°C.) | 511 |
| Annealing Pt. −10$^{13}$ (°C.) | 444 |
| Passed thermal shock test as per MIL-STD-202F Method 107F Condition B | |
| Passed Humidity test as per MIL-STD-202 Method 107 Condition A | |

What is claimed is:

1. A glass consisting essentially of (in mole percent):

| | |
|---|---|
| $P_2O_5$ | 43–59 |
| $SiO_2$ | 0–9 |
| $Al_2O_3$ | 7–11 |
| $Li_2O$ | 0–5 |
| $Na_2O$ | 0–15 |
| $K_2O$ | 0–15 |
| $MgO$ | 0–15 |
| $CaO$ | 0–0.5 |
| $BaO$ | 0–7 |
| $ZnO$ | 0–7 |
| $CeO_2$ | 0–0.5 |
| $CuO$ | 7–21 |
| $V_2O_5$ | 0.07–0.7 |
| $Pr_6O_{11}$ | 0–1.5 |
| $Nd_2O_3$ | 0–1.5 | having a photopic transmission of at least 10% at full rated voltage and a color space of NVIS Green A.

2. A glass according to claim 1, having a NVIS radiance not exceeding $1.7 \times 10^{-10}$ with a lighting source of 0.;1 fL luminance.

3. A glass according to claim 1, consisting essentially of:

| | |
|---|---|
| $P_2O_5$ | 45–55 |
| $SiO_2$ | 0.5–7 |
| $Al_2O_3$ | 8–10 |
| $Li_2O$ | 2–4 |
| $Na_2O$ | 1–7 |
| $K_2O$ | 5–13 |
| $MgO$ | 0–12 |
| $CaO$ | 0–0.3 |
| $BaO$ | 0–5 |
| $ZnO$ | 0–5 |
| $CeO_2$ | 0.2–0.4 |
| $CuO$ | 9–20 |
| $V_2O_5$ | 0.15–0.40 |
| $Pr_6O_{11}$ | 0–1.0 |
| $Nd_2O_3$ | 0–1.0 |

4. A glass according to claim 2, having an NVIS radiance not exceeding $1.7 \times 10^{-10}$ with a lighting source of 0.1 fL luminance.

5. A glass according to claim 1, having a thickness of 3 mm.

6. A glass according to claim 1, having a thickness of 2 mm

7. A glass according to claim 1, having a thickness of 1.5 mm.

8. A glass according to claim 1, having a thickness of 1 mm.

9. A glass consisting essentially of (in mole percent):

| | |
|---|---|
| $P_2O_5$ | 43–59 |
| $SiO_2$ | 0–9 |
| $Al_2O_3$ | 7–11 |
| $Li_2O$ | 0–5 |
| $Na_2O$ | 0–15 |
| $K_2O$ | 0–15 |
| $MgO$ | 0–15 |
| $CaO$ | 0–0.5 |
| $BaO$ | 0–7 |
| $ZnO$ | 0–7 |
| $CeO_2$ | 0–0.5 |
| $CuO$ | 7–21 |
| $V_2O_5$ | 0.07–0.7 |
| $Nd_2O_3$ | 0–1.5, | wherein said glass also contains not more than 1.5 $Pr_6O_{11}$, has a photopic transmission of at least 10% at full rated voltage and a color space of NVIS Green B.

10. An optical filter consisting essentially of a glass of claim 9.

11. A glass consisting essentially of (in mole percent):

| | |
|---|---|
| $P_2O_5$ | 43–59 |
| $SiO_2$ | 0–9 |
| $Al_2O_3$ | 7–11 |
| $Li_2O$ | 0–15 |
| $Na_2O$ | 0–15 |
| $K_2O$ | 0–15 |
| $MgO$ | 0–15 |
| $CaO$ | 0–0.5 |
| $BaO$ | 0–7 |
| $ZnO$ | 0–7 |
| $CeO_2$ | 0–0.5 |
| $CuO$ | 7–21 |
| $V_2O_5$ | 0.07–0.7 |
| $Pr_6O_{11}$ | 0–1.5 |
| $Nd_2O_3$ | 0–1.5 |
| $Nb_2O_5$ | 0–3 |
| $B_2O_3$ | 0–3 |
| $Y_2O_3$ | 0–3 |
| $Cr_2O_3$ | 0–1 | having a photopic transmission of at least 10% at full rated voltage and a color space of NVIS Green A.

12. A glass according to claim 1, consisting essentially of:

| | |
|---|---|
| $P_2O_5$ | 45–55 |
| $SiO_2$ | 0.5–7 |
| $Al_2O_3$ | 8–10 |
| $Li_2O$ | 2–6 |
| $Na_2O$ | 1–7 |
| $K_2O$ | 3–13 |

| -continued | |
|---|---|
| MgO | 0–12 |
| CaO | 0–0.3 |
| BaO | 0–5 |
| ZnO | 0–5 |
| $CeO_2$ | 0.2–0.4 |
| CuO | 9–20 |
| $V_2O_5$ | 0.15–0.40 |
| $Pr_6O_{11}$ | 0–1.0 |
| $Nd_2O_3$ | 0–1.0 |
| $Nb_2O_5$ | 0–2 |
| $B_2O_3$ | 0–2 |
| $Y_2O_3$ | 0–2 |
| $Cr_2O_3$ | 0–0.5 |

13. A glass consisting essentially of (in mole percent):

| | |
|---|---|
| $P_2O_5$ | 43–59 |

| -continued | |
|---|---|
| $SiO_2$ | 0–9 |
| $Al_2O_3$ | 7–11 |
| $Li_2O$ | 0–15 |
| $Na_2O$ | 0–15 |
| $K_2O$ | 0–15 |
| MgO | 0–15 |
| CaO | 0–0.5 |
| BaO | 0–7 |
| ZnO | 0–7 |
| $CeO_2$ | 0–0.5 |
| CuO | 7–21 |
| $V_2O_5$ | 0.07–0.7 |
| $Nd_2O_3$ | 0–1.5 |
| $Nb_2O_5$ | 0–3 |
| $B_2O_3$ | 0–3 |
| $Y_2O_3$ | 0–3 |
| $Cr_2O_3$ | 0–1, | wherein said glass also contains not more than 1.5 $Pr_6O_{11}$, has a photopic transmission of at least 8% at full rated voltage and a color space of NVIS Green B.

* * * * *